United States Patent [19]

Haines

[11] 4,221,508
[45] Sep. 9, 1980

[54] CROP HARVESTER SPOUT CONTROL IMPROVEMENTS

[76] Inventor: Roger D. Haines, 5592 Kerswill Rd., Gladwin, Mich. 48624

[21] Appl. No.: 975

[22] Filed: Jan. 4, 1979

[51] Int. Cl.³ .............................................. B65G 53/40
[52] U.S. Cl. ...................................... 406/41; 56/13.3; 406/160; 406/165; 414/335
[58] Field of Search .................. 406/39, 41, 159, 160, 406/161, 164, 165, 166; 414/335, 345; 56/13.3

[56] References Cited

U.S. PATENT DOCUMENTS

| | | | |
|---|---|---|---|
| 2,465,156 | 3/1949 | Huddle | 406/39 |
| 2,496,472 | 2/1950 | Huddle | 406/41 |
| 2,748,958 | 6/1956 | Moser | 406/161 X |
| 3,014,605 | 12/1961 | Heising | 414/335 |
| 3,901,008 | 8/1975 | Taylor et al. | 56/13.3 X |

Primary Examiner—Jeffrey V. Nase
Attorney, Agent, or Firm—Learman & McCulloch

[57] ABSTRACT

A forage harvesting towing vehicle has a blower discharge tube extending generally vertically and terminating in a laterally rearwardly extending discharge spout for blowing forage material, which has been gathered, into a towed receiving transfer vehicle having an opening at its front end for receiving the material. The tube is mounted for adjustment to position the spout in various positions relative to the towing vehicle to keep its spout properly aligned with the opening in the front end of the towed vehicle.

6 Claims, 10 Drawing Figures

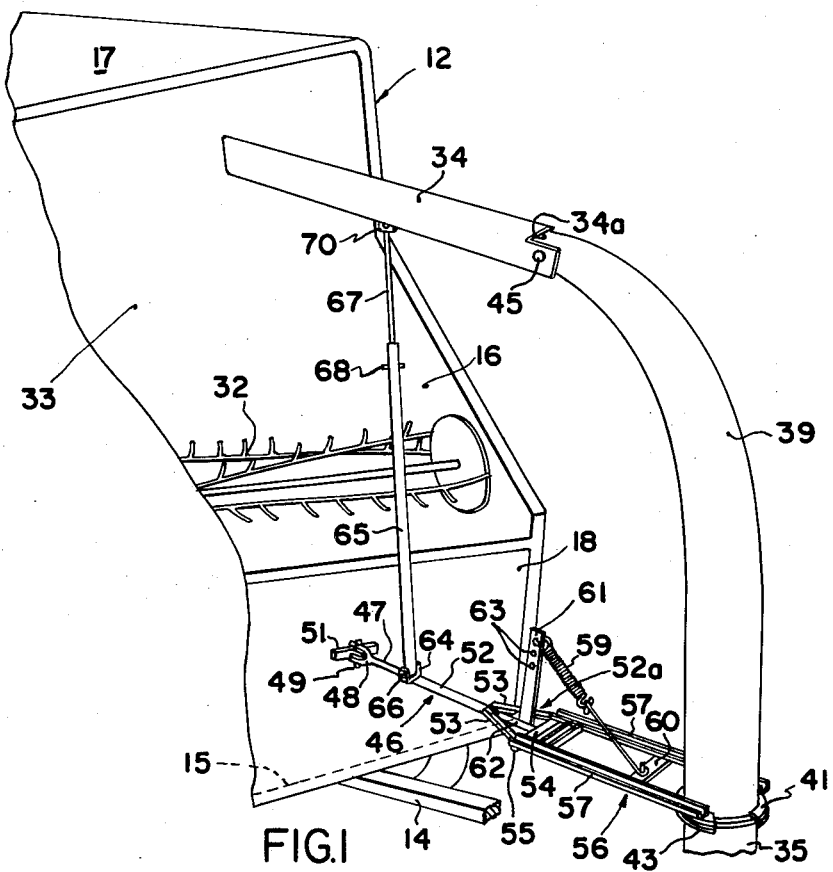
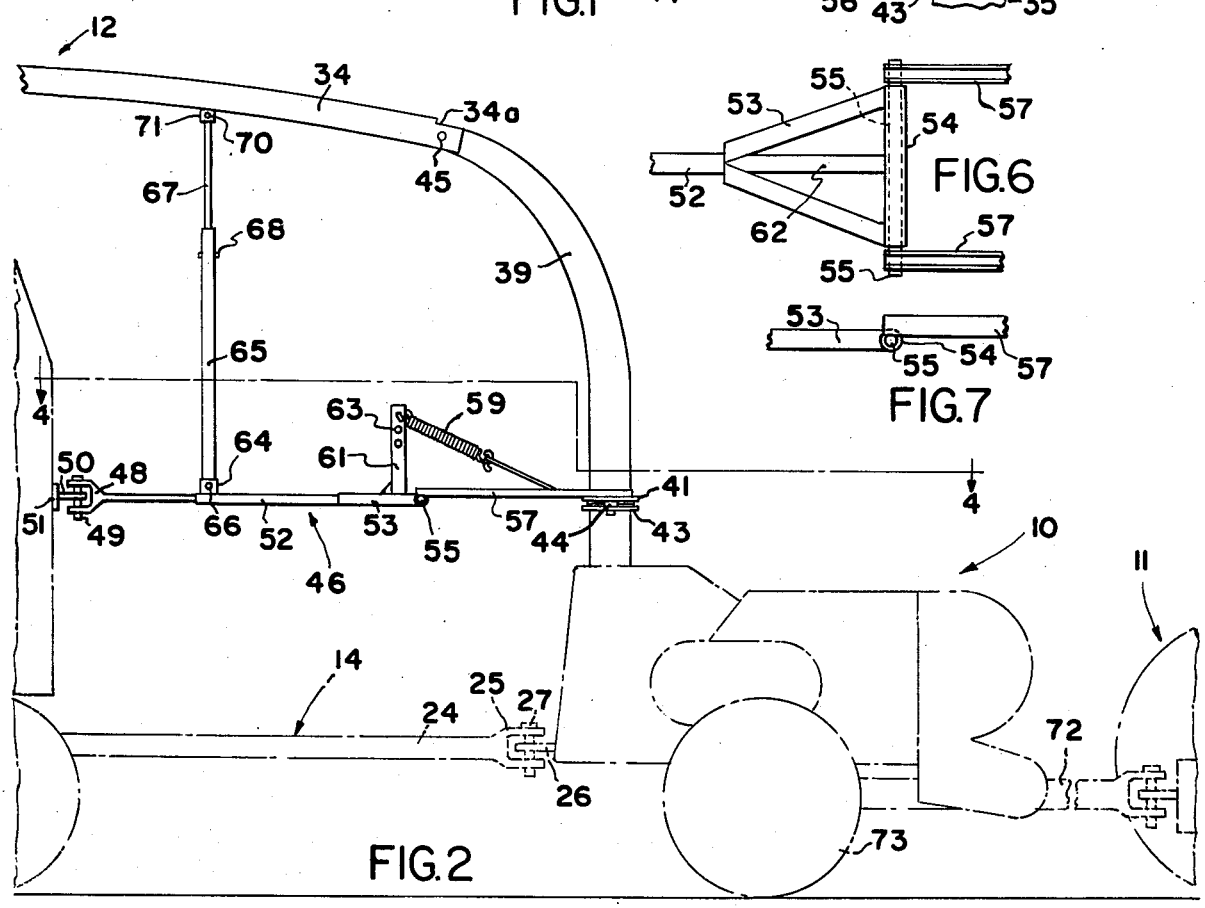

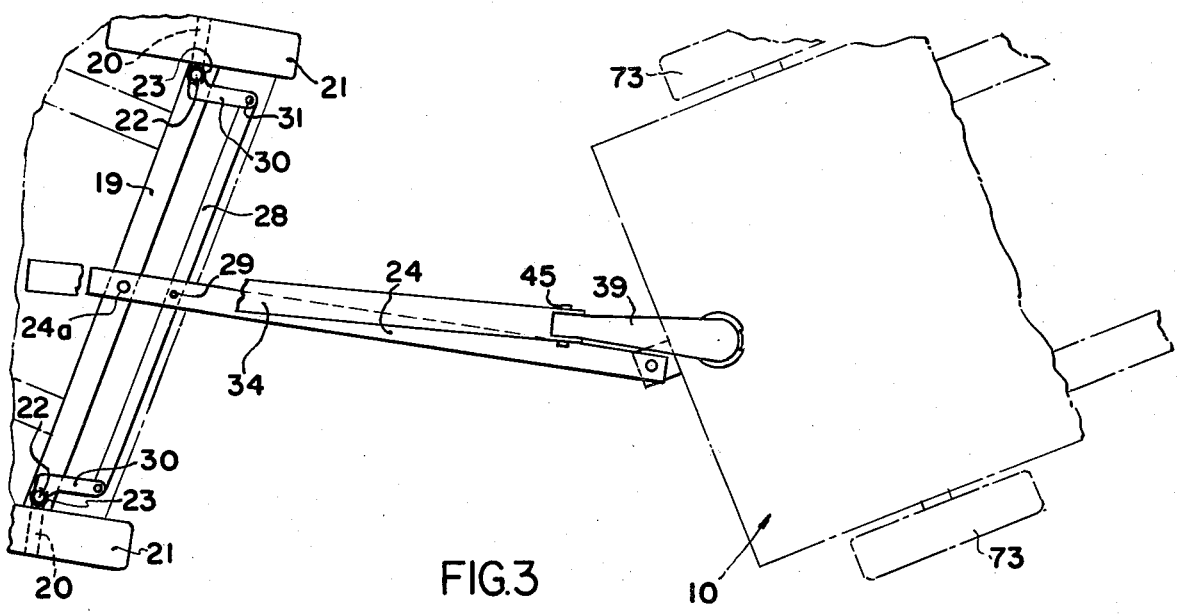
FIG.3
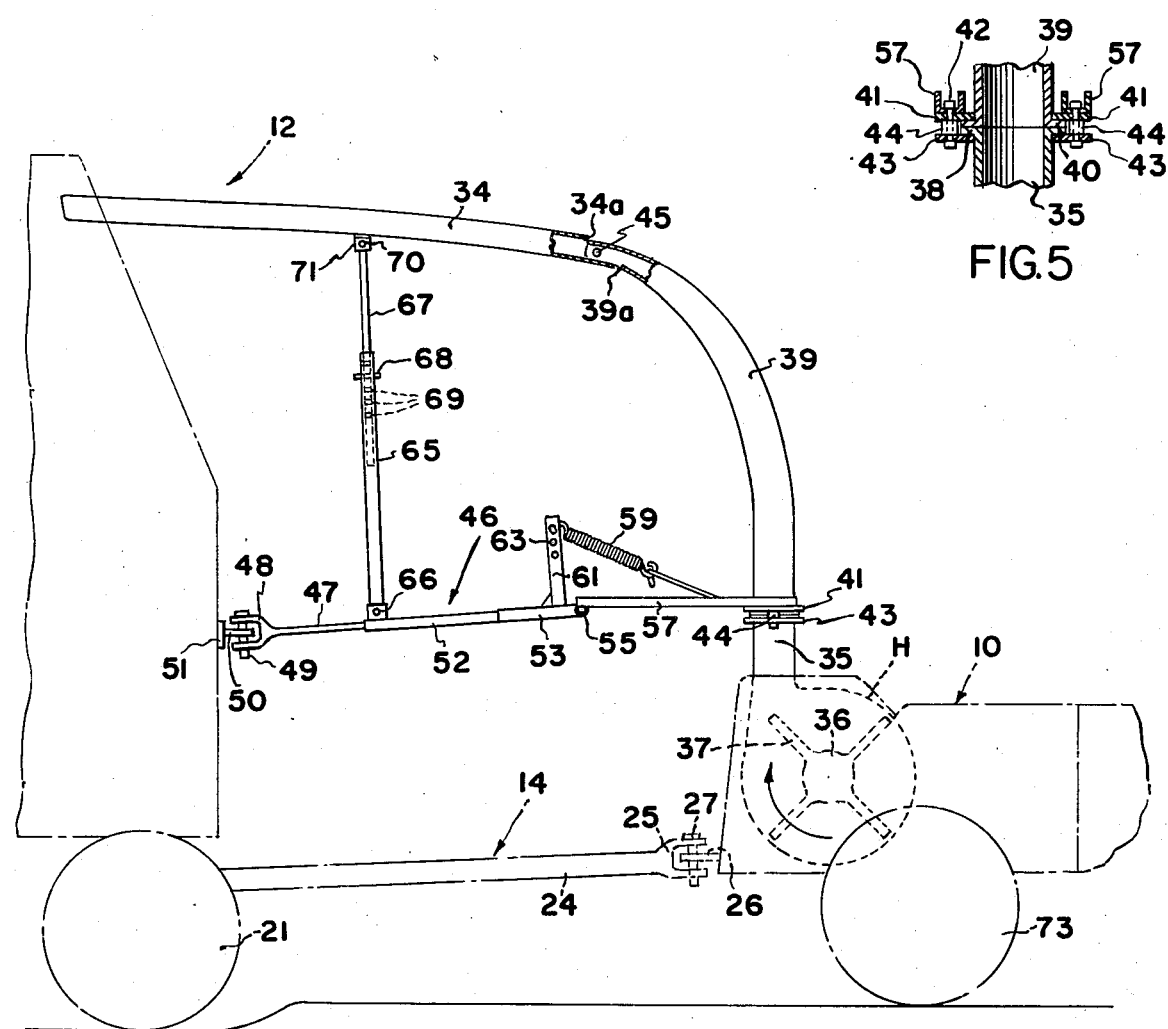
FIG.5
FIG.8

CROP HARVESTER SPOUT CONTROL IMPROVEMENTS

The present application is directed broadly to harvesting machinery, and particularly to systems of the type described in the following United States patents:

| | | | |
|---|---|---|---|
| 3,165,875 | Mitchell | 3,845,608 | Leushen |
| 3,265,444 | Waldrop | 3,883,010 | Heslop |
| 3,367,725 | Sanderson et al | 3,901,008 | Taylor et al |
| 3,372,536 | McCunn | | |

BACKGROUND OF THE INVENTION

The present machine is in the nature of an improvement over the harvesting machinery disclosed in the aforementioned patents which do not disclose mechanism for automatically maintaining the discharge end of the spout in proper discharging position with respect to the opening in the front end of the towed vehicle. With prior art machinery, difficulty has been encountered with manually adjusted discharge spouts which cannot be extended into the open end of the towed receiving vehicle, and one of the prime objects of the present invention is to provide a system in which the spout is so automatically controlled that it will never become misaligned with the opening in the front end of the towed vehicle.

One problem encountered with prior art machinery is the problem which arises when the towing and towed vehicles are moving across uneven ground and become so vertically misaligned that the spout no longer blows material into the receiving opening in the towed vehicle. Thus, an important object of the invention is to provide a harvester system wherein simple and reliable mechanism is provided for automatically ensuring that the position of the spout is adjusted to compensate for this vertical misalignment of the vehicles.

Still a further object of the invention is to provide easily and economically manufactured linkage systems of a highly reliable nature which can connect between the towing vehicle and the harvester blower tube and spout assembly of either newly manufactured or existing machinery, and which is easy to install and maintain.

SUMMARY OF THE INVENTION

Linkage mechanism connects with the towed vehicle in a forage harvester system in which the harvester has a blower discharge conduit with a laterally extending spout to rotate the conduit automatically responsive to any out-of-longitudinal-alignment position of the towed vehicle relative to the towing vehicle and maintain the spout in alignment with the opening in the receiving end of the towed vehicle. The spout is capable of vertical adjustment as well by the linkage which is provided with means to automatically adjust the spout vertically should the towing vehicle and towed vehicle become vertically offset in proceeding across uneven ground.

DESCRIPTION OF THE DRAWINGS

FIG. 1 is a perspective, elevational view of a fragmentary nature, showing the blower spout of the forage harvester emptying into the open upper end of a towed receiving vehicle;

FIG. 2 is a side elevational view thereof, with diagrammatic lines illustrating the harvester vehicle, the towed receiving vehicle and the harvester towing vehicle;

FIG. 3 is a top plan view thereof, illustrating a turning position of the towing and towed vehicles;

FIG. 5 is an enlarged fragmentary sectional elevational view illustrating the bearing mount for the blower conduit;

FIG. 6 is an enlarged fragmentary top plan view illustrating the mechanism permitting vertical buckling of the linkage system;

FIG. 7 is an enlarged fragmentary side elevational view thereof;

FIG. 8 is a side elevational view, similar to FIG. 2 and illustrating the adjusted position of the linkage when the towing and towed vehicles are out of level alignment;

Figure 4:
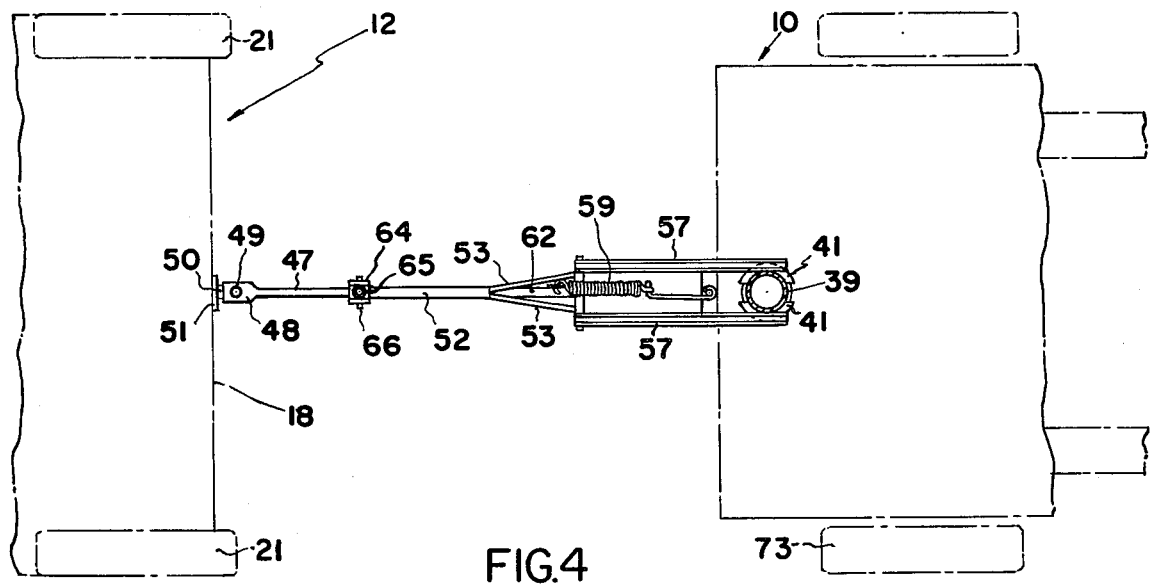
FIG. 4 is a sectional plan view taken on line 4—4 of FIG. 2 and more particularly illustrating the spout position adjusting linkage.

Referring more particularly to the accompanying drawings, and in the first instance to the first embodiment of the invention illustrated in FIGS. 1-8, the harvester vehicle is generally illustrated at 10 in FIGS. 2, 3, 4 and 8 and is termed the towing vehicle, even though it may be itself drawn by a tractor or other motive vehicle, as generally designated at 11. (See FIG. 2). The towed vehicle 12, which is the material receiving vehicle and is used as a transfer vehicle to move harvested crops or the like from the field to the barn or other place of storage, is drawn by the towing vehicle 10 by a conventional towbar mechanism, generally designated 14.

Typically, the material receiving vehicle 12 includes a vehicle bed 15, (FIG. 1) side walls 16, a roof 17, and a partial front wall 18, mounted on a frame generally designated 19 (FIG. 3). Axles 20 journal the wheels 21. Fixed to the axles 20 are upwardly extending posts 22 and the frame 19 includes vertical sleeves 23 which journal the vertical steering posts 22 for pivotal movements about their axes to adjust the angular position of wheels 21 relative to the frame 19. The towbar 24, which includes a clevis 25 at its front end (FIG. 2), is connected with an eye drawbar member 26 via a pin 27. At its rear end it is connected to the frame 19 by a kingpin 24a in the usual manner. Steering tiebar 28, connected to the towbar 24 at 29, pivotally connects to steering rods 30 at 31, the rods 30 being fixed to the posts 22 so that turning movement of towbar 24 is transmitted to turn the wheels 21 simultaneously via the tiebar 28 and steering rods 30.

The towed vehicle 12 is typically one in which conveyors (not shown) are mounted over the bed 15 of the vehicle to feed material continuously to a side discharge opening at a time when the vehicle is brought to an unloading position adjacent the silo or other storage receptacle for the material, and, shown in the drawing, is the typical revolving beater 32 which is provided to help move the material in the vehicle downwardly to a position where it can be engaged by the discharge conveyors. Above the beater 32, the entire front end of the vehicle 12 is open, as shown at 33, to receive material from the discharge spout 34 which, as FIG. 2 particularly indicates, projects slightly into the opening or chamber 33 so that its discharge is not affected by crosswinds. The present discharge spout 34 can be so extended because its angular and vertical position is always maintained in alignment with the opening 33 and it never can be in a position to be crushed or damaged by striking the vehicle sidewall or the beater 32.

The towing vehicle 10 is a conventional forage harvester of which various varieties are presently comcercially available, and exemplified in the aforementioned patents. Such harvesters conventionally include pick-up tines of the type shown in these patents, which are incorporated herein by reference, which feed material to transversely extending augers. The augers in turn feed material to the blower fan housing H, shown in diagrammatic lines in FIG. 8, which has an outlet conduit 35 and incorporates a tractor driven fan 36, with fan blades 37 to move the material and create an airstream which conveys the material upwardly through conduit 35.

Mounted on the open, flanged (38) upper end of conduit 35 to rotate thereon is a curvilinear conduit extension 39 which has a flange 40 (FIG. 5) in bearing engagement with the flange 38. Segment plates 41, welded to the conduit 39, bolt, as at 42, to segment plates 43 which project inwardly to underlie flange 38. The plates 43 are rotatable with respect to the conduit 35 and spacer sleeves 44 are provided to maintain the spaced alignment of the plates 41 and 43.

At its upper end, the conduit extension 39 communicates with the spout 34, which is pivotally mounted to it at 45. The spout 34 extends over the tube 39 as indicated, and the top wall of spout 34 and bottom wall of tube 39 are cut away, as at 34a and 39a, respectively, so that the necessary relative pivoting can occur and the stream of material continues smoothly from one conduit to the other, regardless of the vertical position of spout 34 relative to tube 39.

A linkage system, generally designated 46, which is uniquely responsive to the position of the material receiving towed vehicle 12 and adjusts spout 34 accordingly, includes a control rod 47, having a clevis 48 at its rear end, so that it can be pivotally attached via removable drawpin 49 to the eye 50 of a drawbar 51 mounted on the front wall 18 of the vehicle 12. The removable drawpin 49 is of such vertical extent, and the clevis 48 is sufficiently vertically large that vertical pivoting of the control arm 47 about the pin 50 can occur. The rod 47, which is laterally swingable about pin 49, is telescopically received in a first link part or sleeve 52. The sleeve 52 is part of a frame, generally designated 52a, which includes brace members 53 (FIG. 6), joined by a transversely extending sleeve 54. The sleeve 54 pivotally receives a crosspin 55 which is welded to the front end of a crank arm frame, generally designated 56, which is bolted or otherwise fixed to the segment plates 41. The frame 56 comprises a pair of spaced-apart channel members or second link parts 57 which are welded directly to pin 55 and which bolt, as with bolts 42 to the segment plates 41 at each side of the conduit extension 39. Thus, the sleeve 52 is capable of buckling movement about the pin 55 as an axis. The linear alignment of frames 52a and 56 is however normally maintained by a spring 59 which connects between a cross plate 60 fixed between channel members 57, and a vertical bar 61 welded to a bar 62, fixed to the diverging braces 53. A plurality of openings 63 are provided for possible connection of spring 59 to provide the desired relative position of the frames 52a and 56. Frame part 52 has a clevis mount 64 for pivotally mounting a vertical sleeve 65 via pin 66. The sleeve 65 telescopically receives an upper rod 67 and the rod 67 can be fixed in position by a pin 68 extending through one of a plurality of openings 69 to provide precise vertical adjustment of the upper rod 67. Rod 67 is pivotally connected at 70 to a clevis mount 71 depending from the spout conduit section 34.

The telescoping rods 65 and 67 are rigid, as are the conduit sections 34 and 39, and the pin 68 is inserted through an opening which will always maintain the spout section 34 in a position to feed material into the chamber 33 with expected levels of uneven ground. Generally speaking, it is desired to have the spout 34 project into the very upper end of the receiving opening 33 so that the material will be projected further toward the far end of the vehicle 12 and thus the adjustment can accommodate to the height of the particular receiving wagon being used. Because the control rod 47 is freely telescopically received within the sleeve 52, it would be possible for the towing vehicle to be simply driven away from the towed vehicle without damaging the linkage system 46, if the operator inadvertently disconnected the towbar 24 and forgot to disconnect the clevis 48. While in FIG. 2, the tractor vehicle 11 is only shown diagrammatically as a wheel part with a towbar 72, it is to be understood that the vehicle 10 is steered by the towbar 72 which can be of the same construction as towbar 24 and connected to the vehicle 10 in the same manner, so that the wheels 73 of the towing vehicle 10 are steered by the wheels of the tractor 11.

THE OPERATION

In operation, and referring now particularly to FIGS. 3 and 8, it will be seen that the towed vehicle 10 in FIG. 3 has turned from its position of longitudinal alignment with the towed vehicle 12, and that regardless of this position of relative longitudinal misalignment, the spout 34 remains substantially centrally aligned with the opening 33. While in the drawings, the conduit 39 has been shown as approximately centrally located on the vehicle 10, it is to be understood that in many such forage harvesting vehicles it is centrally offset with an auger conveyor axially aligned with blower fan 36 feeding material to the fan housing H from one end, and regardless, the linkage system, which has been described, would maintain the spout 34 in a position such that it would laterally centrally discharge to the chamber 33 in towed vehicle 12. This is true because the control rod 47 senses the relative misalignment and transmits a turning motion to the frame 56 which turns conduit 39 and spout 34 about the vertical axes of the discharge conduit 35.

At the same time, and referring now particularly to FIG. 8, should the wheels of the towing vehicle 10 be raised with respect to the wheels of the towed vehicle 12 the control rod 47 would tend to pull the rods 65-67 downwardly about pivot 55 to pull the spout 34 downwardly (about pivot 45) sufficiently to maintain its normal position of discharge near the upper end of the vehicle chamber 33. When the vehicles were again on even ground, the spring 59 would return the spout 34 to its normal position by pushing the rod system 65-67 upwardly to pivot spout 34 about the pivot 45.

A MODIFIED EMBODIMENT

Figure 9:
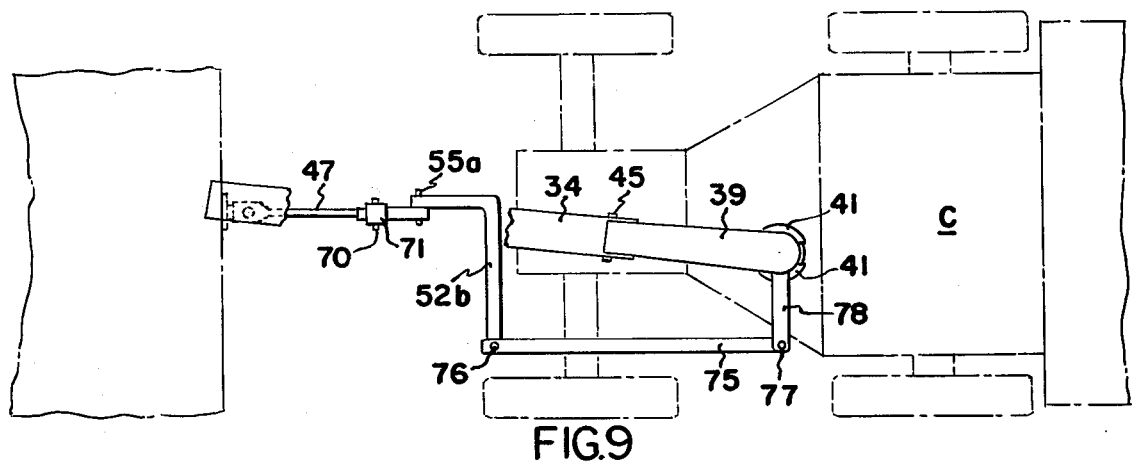
FIG. 9 is a fragmentary top plan view, similar to FIG. 4 and illustrating a modified linkage system which can be employed.
Figure 10:
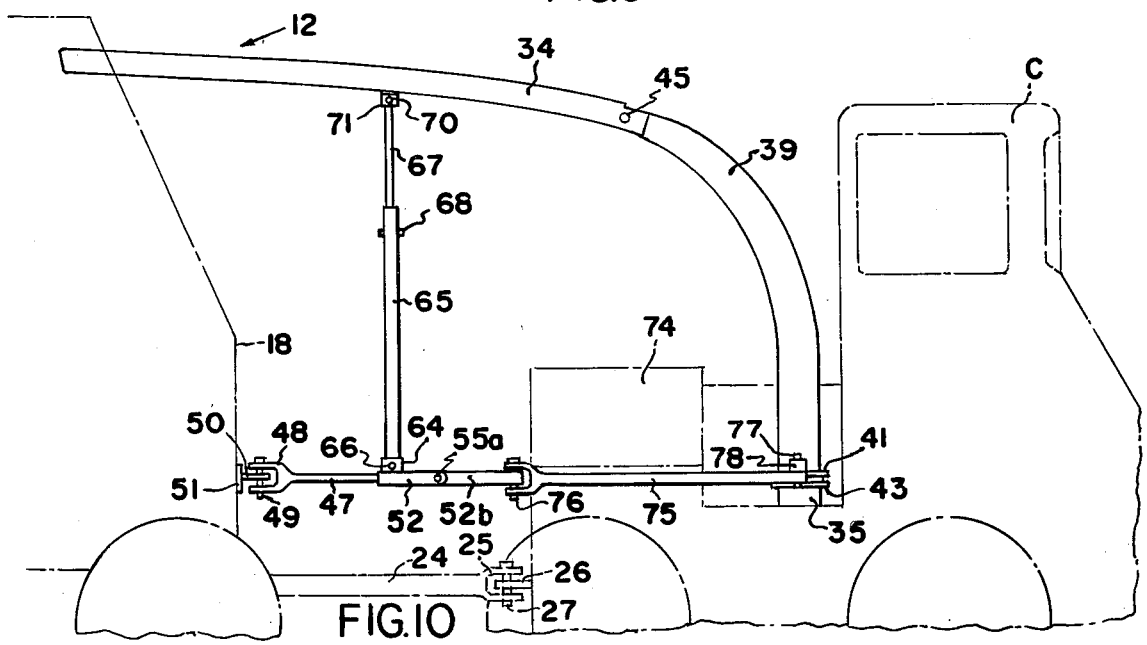
FIG. 10 is a side elevational view thereof.

In FIGS. 9 and 10, a modified embodiment of the invention has been illustrated, and for the sake of convenience similar parts have been given the same numerals.

In the embodiment shown in FIGS. 9 and 10, the forage harvester is of a self-propelled type and includes a cab C for the operator. In this embodiment of the invention the spout system 35,39,34 is transversely offset and a housing 74 extending from the cab C prevents use of a linkage with straddling channel arms 57. In this embodiment, the control rod 47 and rod-receiving sleeve 52 are pivoted as at 55a to a bell crank lever 52b, which is pivotally connected to a rod 75 as at 76. The rod 75 is pivotally connected as at 77 to a crankarm 78, which in turn is fixed to one of the segment plates 41. Thus, lateral turning movement of the control arm 47 is transmitted by the bell crank 52b to the rod 75 and moves it longitudinally fore and aft to control the position of crank arm 78 and rotate the conduit 39 and spout 34 sufficiently to maintain the centered position of the discharge end of spout 34. Vertical pivoting of the spout 34 about the pivots 45 and 55a, via rods 65 and 67, is accomplished in the same manner as previously. Thus, the operation of the linkage is essentially the same, but the motion is transmitted from one side of conduit 39 only so that the housing 74 does not interfere with the operation of the linkage.

It is to be understood that the drawings and descriptive matter are in all cases to be interpreted as merely illustrative of the principles of the invention, rather than limiting the same in any way, since it is contemplated that various changes may be made in various elements to achieve like results without departing from the spirit of the invention or the scope of the appended claims.

I claim:

1. In a harvester system for forage material and the like: a wheel supported, towing vehicle with a blower discharge conduit extending vertically therefrom and terminating in a laterally rearwardly extending discharge spout; means for creating a material conveying air stream blowing out the end of the discharge spout; means for feeding gathered material into said air stream; a wheel supported towed vehicle having a front end opening for receiving the material from said spout and into which said spout projects; towbar means connecting the towed vehicle to the towing vehicle to receiving steering movement therefrom; bearing means mounting the conduit for rotation about a generally vertical axis to position the spout in various laterally adjusted positions relative to the towing vehicle to keep its discharge end properly aligned with the said front end opening; linkage means connecting with the conduit to rotate it, which is responsive automatically to the longitudinal non-alignment of the towed vehicle relative to the towing vehicle, as when the towing vehicle is turning from the track of the towed vehicle, to rotate the conduit sufficiently about its axis in either direction to maintain the alignment of the spout with the said opening; the spout being mounted for vertical movement and said linkage means being provided with means to automatically move the spout vertically should the towing vehicle and towed vehicle become vertically misaligned when proceeding across uneven ground.

2. An improved system as defined in claim 1 in which said linkage means comprises a first link part mounted pivotally on the towed vehicle to swing laterally in a generally horizontal plane relative thereto and a second link part connecting to said conduit to rotate it as the linkage is displaced from linear alignment with the towing vehicle.

3. An improved system as defined in claim 2 in which the spout is mounted for vertical movement relative to the remainder of the conduit, and the first and second link parts are vertically buckleable.

4. The improved system defined in claim 3 in which a spring is connected to normally maintain the first and second parts in horizontal alignment.

5. In a harvester system for forage material and the like including: a wheel supported, towing vehicle with a blower discharge conduit extending vertically therefrom and terminating in a laterally rearwardly extending discharge spout; means for creating a material conveying air stream blowing out the end of the discharge spout; means for feeding gathered material into said air stream; a wheel supported towed vehicle having a front end opening for receiving the material from said spout; towbar means connecting the towed vehicle to the towing vehicle to receive steering movement therefrom; and means mounting the spout for generally vertical movement to position the spout in various vertically adjusted positions relative to the towing vehicle to keep its discharge end properly aligned with the said front end opening, the improvement comprising:

linkage means, connecting the towed vehicle with the conduit, which is responsive automatically to vertical non-alignment of the towed vehicle and towing vehicle, to move the spout sufficiently vertically in either direction to maintain the desired alignment of the spout with the said opening.

6. An improved system as defined in claim 5 in which the spout is mounted for vertical pivotal movement on the conduit, and said linkage means connects to the spout to move it automatically responsive to longitudinal non-alingment of the towed and towing vehicles to move the spout sufficiently to maintain the vertical alignment of the spout with the opening.

* * * * *